Dec. 23, 1941.    E. R. COLE    2,267,673
MANUFACTURE OF CARBON ELECTRODES
Filed April 11, 1940

INVENTOR
Edward R. Cole
BY
Griswold & Burdick
ATTORNEYS

Patented Dec. 23, 1941

2,267,673

UNITED STATES PATENT OFFICE 2,267,673

MANUFACTURE OF CARBON ELECTRODES

Edward R. Cole, Midland, Mich., assignor to The Dow Chemical Company, Midland, Mich., a corporation of Michigan Application April 11, 1940, Serial No. 329,191

9 Claims. (Cl. 18—47.5)

This invention relates to the preparation of shaped carbon articles. More particularly, it concerns certain improved procedural steps in the manufacture of carbon electrodes for electrolytic and electrothermal purposes.

In the manufacture of shaped carbon articles such as electrodes, it is customary practice to form a mixture of a carbonaceous aggregate, such as ground petroleum coke, and a thermoplastic binder, e. g. pitch, and then to shape the mixture to the desired form by extruding it through a suitable die while it is at a temperature above the congealing temperature of the binder. The extruded articles, while still plastic, are then transferred to a cooling zone, ordinarily a trough of water, where they are cooled to set the binder throughout. Finally, the cooled products, usually termed "green" electrodes, are baked at an elevated temperature in the absence of air to remove volatile impurities, thereby forming amorphous carbon electrodes. If desired, these latter may be further heated at extreme temperatures to convert the carbon to graphite.

It will be appreciated that the preparation of the "green" electrodes is perhaps the most significant part of the manufacturing process, since unless the "green" electrodes are acceptable it is not possible to obtain satisfactory baked electrodes. Unfortunately, however, the preparation of "green" electrodes as heretofore carried out usually forms a very appreciable proportion of electrodes which, instead of being straight, as desired, are distorted, misshapen, or strained internally, and must be scrapped.

It is therefore an object of the invention to provide an improved method of making "green" electrodes and like carbon articles which virtually eliminates the distortion difficulties and electrode strains encountered in prior processes.

It has been found that distortion results primarily from deforming stresses which act on the "green" electrode when it is still in the plastic state, that is, just after it has been extruded and while it is being transferred to the water trough or other zone where it is cooled to set the binder. This transfer is ordinarily effected by a lifting operation, or by rolling the electrode down a ramp or along a table to the cooling zone. In the former case the electrode tends to sag under its own weight, and in the latter, it tends to assume the form of any irregularities in the surface over which it is rolled; in either event, the electrode is subjected to deforming stresses, and, in a considerable proportion of the instances, becomes distorted.

According to the invention, these distortions are substantially avoided by shock-chilling the plastic extruded electrode to effect a superficial hardening thereof before it is subjected to deforming stresses. In practice, the plastic electrode is supported throughout its length as it is extruded, and then, while still supported, is shock-chilled by directing a cooling fluid, usually a water spray, into contact therewith for a time sufficient to effect superficial hardening. In this way, the electrode is, so to speak, case-hardened by the setting of the plastic binder near the surface, and is rendered sufficiently rigid that it may be lifted, rolled, and subjected to other ordinary stresses without undergoing distortion during subsequent handling.

In preparing "green" electrodes or other shaped carbon articles by the process of the invention, the mixing, extruding, and final cooling operations are carried out according to known procedure. Thus, the carbonaceous aggregate, e. g. calcined petroleum coke, coal, coke, retort carbon, graphite, green scrap, or a mixture thereof, is ground to a fine state, and is then mixed at an elevated temperature with a smaller proportion of a carbonaceous thermoplastic binder, usually pitch; a little summer oil or other lubricant may be added if desired. The mixture is then transferred to an extrusion press and, while still at a temperature above the congealing temperature of the binder, is forced through the die to form a plastic "green" article. After the latter is shock-chilled according to the invention to effect a superficial hardening, it may then be transferred to a final cooling zone where it is cooled slowly to set the binder throughout.

In addition to providing a method of preventing distortion of the extruded plastic "green" electrode during handling subsequent to extrusion, the invention also contemplates removing any imperfections or distortions of the electrode which may have occurred during the extrusion itself. In the case of cylindrical electrodes this result is accomplished by supporting the extruded electrode while still plastic by tangential contact lengthwise between two parallel horizontal adjacent convex smooth surfaces moving in opposite directions, whereby the electrode is rotated and is subjected to a smoothing and straightening action. In practice, the plastic electrode is placed lengthwise on two parallel horizontal adjacent rolls, and one of the rolls is rotated, thus rolling the electrode about its major axis under its own weight, smoothing and straightening it. The electrode may then be shock-chilled to effect a superficial hardening while it is still being rotated, after which it is transferred to a final cooling zone.

In the case of prismatic electrodes, i. e. those extruded through a polygonal die, usually a rectangular one, the smoothing and straightening are accomplished by enclosing the electrode while it is still plastic between closely fitting surfaces conforming to the shape of the electrode, and rotating the electrode while thus enclosed, as will be explained later. The electrode may then be shock-chilled to harden its surface, and transferred to a final cooling zone.

The process of the invention may be further explained with reference to the accompanying drawing in which Figure 1 is an end elevation showing diagrammatically one form of apparatus adapted to prepare cylindrical carbon electrodes according to the invention;

Figure 2:
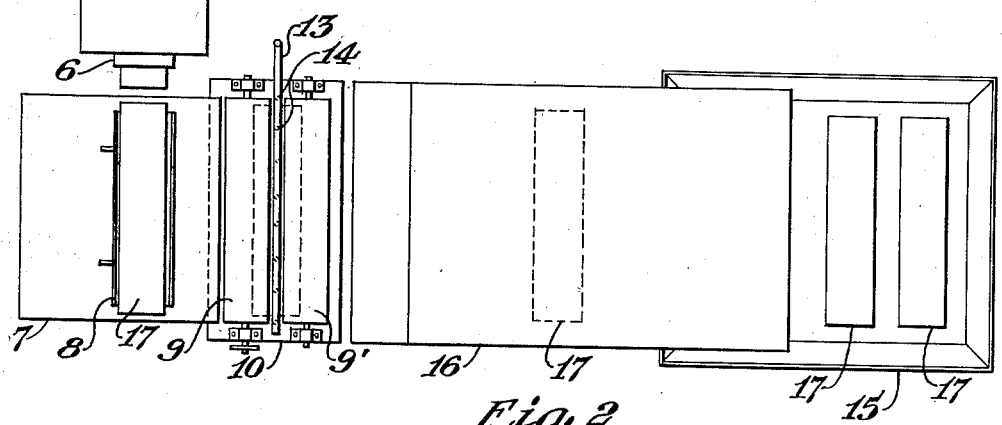
Figure 2 is a plan view of the apparatus of Figure 1.
Figure 1:
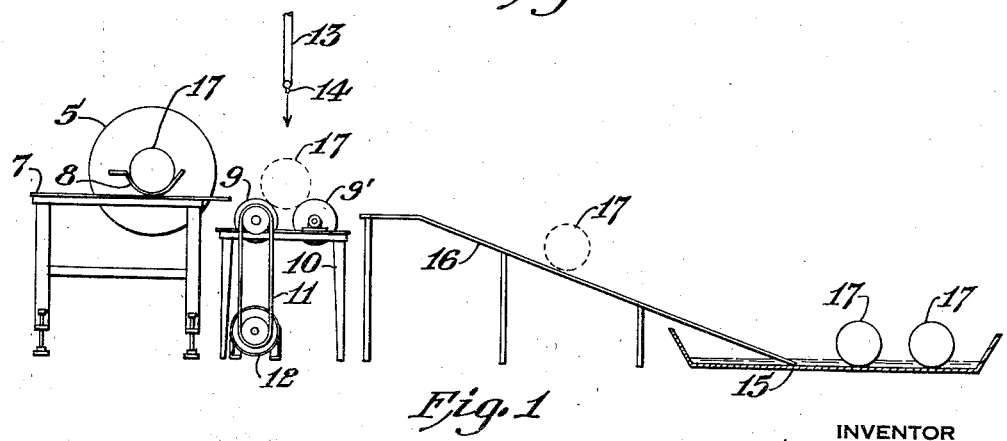

The apparatus illustrated in Figures 1 and 2 includes an extrusion press 5 provided with a circular die 6. In front of the press is an adjustable table 7 on which rests a semicircular trough-like metal cradle 8 which is adapted to receive an extruded electrode and support it throughout its length. Near the table 7 is a pair of parallel horizontal adjacent brass rolls 9 and 9' of equal diameter supported by bearings mounted in a suitable framework 10, one of the rolls 9' being an idler, and the other 9 being connected by a chain drive 11 to a motor 12. Directly above the rolls is a spray pipe 13 having nozzles 14 along its length. Near the rolls is a cooling trough 15 partly filled with water, to which electrodes may be lowered from the rolls by means of a ramp 16.

In a preferred method of preparing electrodes, ground calcined petroleum coke and pitch are mixed at a temperature above the congealing temperature of the pitch, in apparatus not shown, and the hot mixture is charged into the extrusion press 5. The press is then set in operation to force the plastic mixture through the die 6 to form an electrode 17 of the desired length, which may then be cut free at the die with a strand of piano wire or other cutting tool. The table 7 and cradle 8 are adjusted so that the cradle supports the plastic electrode 17 throughout its length as it is being extruded. After extrusion is complete, the roll 9 is started rotating slowly, and then the cradle 8 is then rocked forward to transfer the electrode to the rolls where it rests lengthwise between the two rolls 9 and 9', as shown by the dotted lines. The electrode is rotated by the action of the roll 9, and is subjected to a smoothing and straightening action; two or three revolutions are usually sufficient. Then, with the rolls still running, the spray 13 is turned on, causing a shower of fine droplets of cold water to fall on the rotating plastic electrode, shock-chilling it and effecting a superficial hardening of the electrode, rendering it sufficiently rigid to withstand ordinary stresses without deformation. Ordinarily, exposure to the water spray for a minute, or even less, is adequate to cause a sufficient hardening. Too long an exposure to the shock-chilling of the spray will cause more than a mere superficial hardening, and is to be avoided since it may lead to internal strains or cooling cracks.

After being sprayed the electrode is lifted to the ramp 16 and rolled into the water trough 15 and is thereby cooled slowly for a time sufficient to set the pitch burner throughout. Alternately the superficially hardened electrode leaving the rolls may be cooled to set the binder merely by allowing it to stand in circulating cool air.

Figure 4:
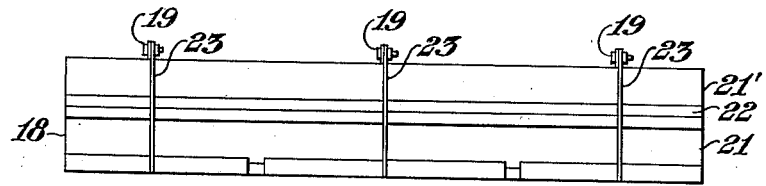
Figure 4 is a plan view of the same case.
Figure 3:
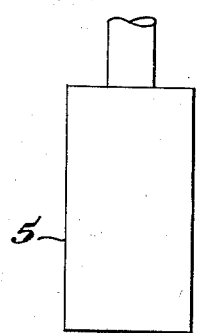
Figure 3 is an end view of a removable case used in making square electrodes, showing the case closed.
Figure 3:
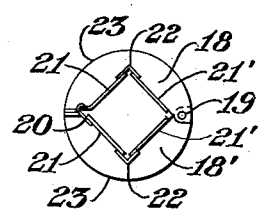
Figure 5:
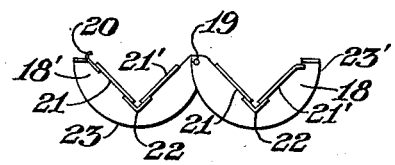
Figure 5 is an end view of the case, shown open.

The preparation of prismatic electrons, e. g. square electrodes, is carried out according to the same process, except that the die 6 of the extrusion process is changed to a square die, and the cradle 8 is replaced by a closely-fitting removable supporting case, such as is shown in Figures 3, 4 and 5. This case consists of two identical rigid L-shaped halves 18 and 18' which are fastened together by hinges 19, and may be held closed by a clamp 20 to form a rectangular box-like mold. Each half is constructed of two rectangular brass plates 21 and 21' welded to an angle iron 22 at right angles to one another, each plate being of the same width as a side of the square electrode to be extruded. The case thus conforms to the extruded electrode. Welded transversely around the outside of the case are split circular discs 23 and 23', which are so positioned that the case, when closed, is free to roll smoothly on the discs.

In making a square electrode, a plastic carbonaceous mixture is charged into the press 5 and extruded through a square die with its diagonal vertical. The supporting case 18—18' is laid open on the table 7, in a position adapted to support the electrode as it is extruded. When extrusion is complete, the electrode is cut off, and the case is closed and transferred to the rolls 9—9'. It is then rolled to smooth and straighten the plastic electrode, and the latter is shock-chilled to effect surface hardening exactly as in the case of a circular electrode. The surface-hardened electrode and case are then rolled down the ramp 17 to the trough 16 where the case is removed and the electrode further cooled to set the binder. In this latter form of the process, it is not essential that the square electrode and supporting case be rotated on the rolls 9—9', since equally good results are obtained merely by rolling the case back and forth on a flat surface while spraying water on it.

While the invention has been described chiefly with reference to preparing carbon electrodes, it will be appreciated that it is applicable to preparing shaped carbon articles of all sorts.

It is to be understood that the foregoing description is illustrative rather than strictly limitative, and that the invention is co-extensive in scope with the following claims.

I claim:

1. In a process of preparing shaped carbon articles, the steps which comprise: forming a plastic mixture consisting essentially of a carbonaceous aggregate and a thermoplastic binder; shaping the mixture by extruding it through a die at a temperature above the congealing temperature of the binder; supporting the shaped article while still plastic throughout its length by rigid, straight contact surfaces and rotating the article about its longitudinal axis while thus supported, whereby the article is subjected to a smoothing and straightening action; shock-chilling the plastic article to effect a superficial hardening thereof by directing a cooling fluid into contact therewith while it is still being rotated; and then removing the superficially hardened article from its support and further cooling it slowly to set the binder throughout.

2. In a process of preparing cylindrical shaped carbon articles, the steps which comprise: forming a plastic mixture consisting essentially of a carbonaceous aggregate and a thermoplastic binder; shaping the mixture by extruding it through a circular die at a temperature above the congealing temperature of the binder; supporting the shaped article while still plastic by tangential contact lengthwise between two parallel horizontal adjacent convex smooth surfaces moving in opposite directions, whereby the article is rotated about its major axis and is subjected to a smoothing and straightening action; shock-chilling the plastic article to effect a superficial hardening thereof by directing a cooling fluid into contact therewith while it is still being rotated; and then removing the superficially hardened article from its support and further cooling it slowly to set the binder throughout.

3. In a process of preparing cylindrical carbon electrodes, the steps which comprise: forming a plastic mixture consisting essentially of ground calcined petroleum coke and pitch; shaping the mixture by extruding it through a circular die at a temperature above the congealing temperature of the pitch; placing the extruded electrode while still plastic lengthwise on two parallel horizontal adjacent rolls and rotating one of the rolls, whereby the electrode is rotated about its major axis and is subjected to a smoothing and straightening action; shock-chilling the plastic electrode to effect a superficial hardening thereof by directing a cooling fluid into contact therewith while it is still being rotated on the rolls; and then removing the superficially hardened electrode from the rolls, and further cooling it slowly to set the binder throughout.

4. A process according to claim 3 wherein the plastic electrode is superficially hardened by spraying water thereon, and wherein the further cooling to set the binder is effected by at least partially submerging the superficially hardened electrode in a body of water.

5. In a process of preparing prismatic carbon electrodes, the steps which comprise: forming a plastic mixture consisting essentially of ground calcined petroleum coke and pitch; shaping the mixture by extruding it through a polygonal die at a temperature above the congealing temperature of the pitch; enclosing the extruded electrode while it is still plastic in a removable supporting case conforming to the shape of the electrode, and rotating the case and the enclosed plastic electrode, whereby the electrode is rotated about its major axis and is subjected to a smoothing and straightening action; subjecting the encased electrode to shock-chilling to effect a superficial hardening thereof by directing a cooling fluid into contact with the case; and then removing the case from the superficially hardened electrode, and further cooling the electrode slowly to set the binder.

6. In a process of preparing prismatic carbon electrodes, the steps which comprise: forming a plastic mixture consisting essentially of a carbonaceous aggregate and a thermoplastic binder; shaping the mixture by extruding it through a polygonal die at a temperature above the congealing temperature of the binder; enclosing the extruded electrode while it is still plastic in a removable supporting case conforming to the shape of the electrode, and rotating the case and the enclosed plastic electrode, whereby the electrode is rotated about its major axis and is subjected to a smoothing and straightening action; subjecting the encased electrode to shock-chilling to effect a superficial hardening thereof by directing a cooling fluid into contact with the case; and then removing the case from the superficially hardened eelctrode, and further cooling the electrode slowly to set the binder.

7. In a process of preparing shaped carbon articles, wherein a plastic mixture consisting essentially of a carbonaceous aggregate and a thermoplastic binder is shaped by extruding it through a die at a temperature above the congealing temperature of the binder and is then transferred to a zone wherein it is cooled to set the binder, the improvement which comprises: supporting the shaped article while it is still plastic throughout its length by rigid, straight contact surfaces and rotating the article about its longitudinal axis while thus supported, whereby the article is subjected to a smoothing and straightening action; and shock-chilling the plastic article to effect a superficial hardening thereof by directing a cooling fluid into contact therewith while it is still being rotated.

8. In a process of preparing cylindrical shaped carbon articles, wherein a plastic mixture consisting essentially of a carbonaceous aggregate and a thermoplastic binder is shaped by extruding it through a circular die at a temperature above the congealing temperature of the binder and is then transferred to a zone wherein it is cooled to set the binder, the improvement which comprises: supporting the shaped article while it is still plastic by tangential contact lengthwise between two parallel horizontal adjacent convex smooth surfaces moving in opposite directions, whereby the article is rotated about its major axis and is subjected to a smoothing and straightening action; and shock-chilling the plastic article to effect a superficial hardening thereof by directing a cooling fluid into contact therewith while it is still being rotated.

9. In a process of preparing prismatic carbon electrodes, wherein a plastic mixture consisting essentially of a carbonaceous aggregate and a thermoplastic binder is shaped by extruding it through a polygonal die at a temperature above the congealing temperature of the binder and is then transferred to a zone wherein it is cooled to set the binder, the improvement which comprises: enclosing the extruded electrode while it is still plastic in a removable supporting case conforming to the shape of the electrode and rotating the case and the enclosed plastic electrode, whereby the electrode is rotated about its major axis and is subjected to a smoothing and straightening action; and shock-chilling the enclosed electrode to effect a superficial hardening thereof by directing a cooling fluid into contact with the case while it is being rotated.

EDWARD R. COLE